United States Patent Office 3,233,001
Patented Feb. 1, 1966

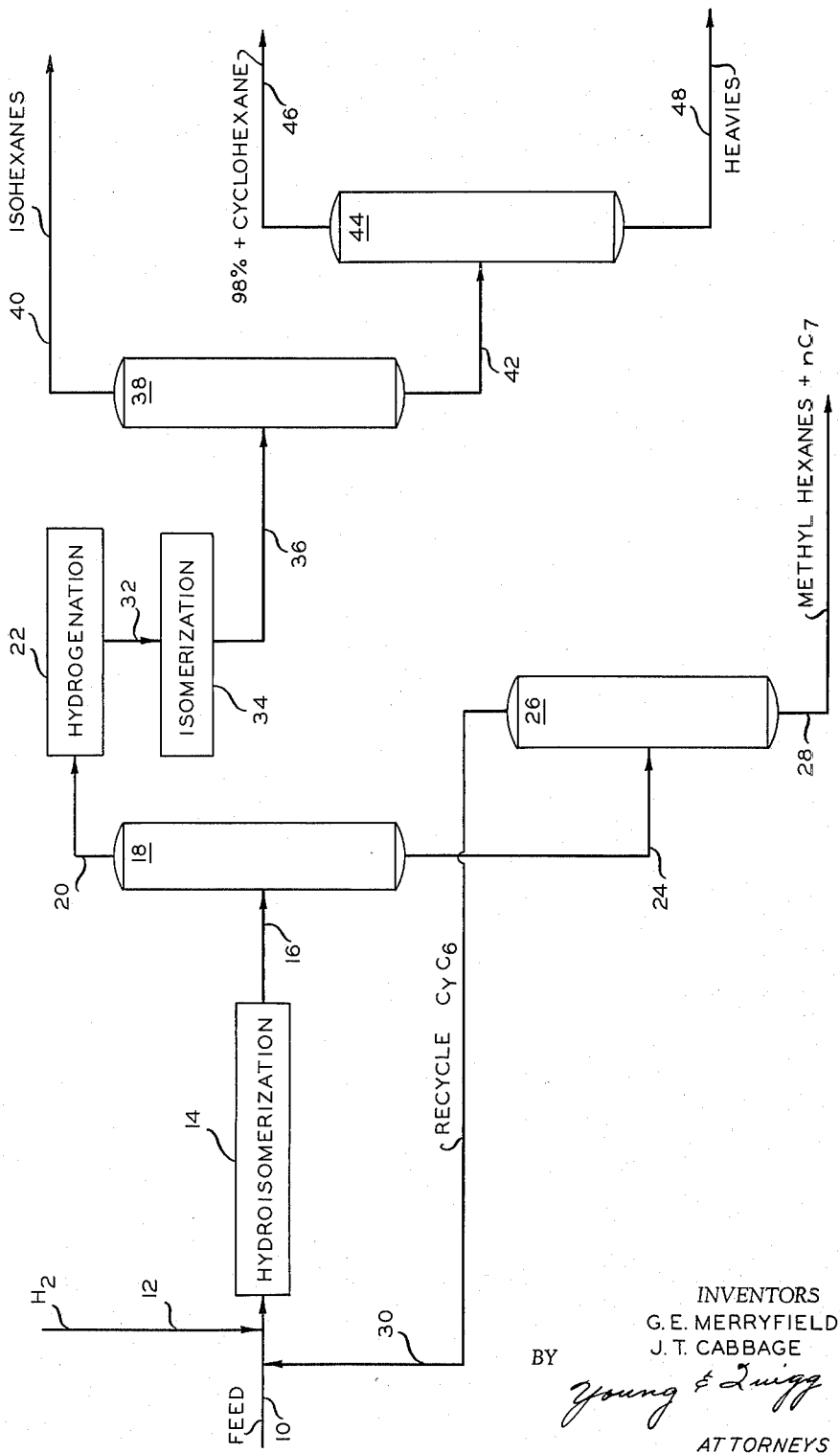

3,233,001
PROCESS FOR PRODUCING CYCLOHEXANE
George E. Merryfield and John T. Cabbage, Bartlesville, Okla., assignors to Phillips Petroleum Company, a corporation of Delaware
Filed Jan. 25, 1963, Ser. No. 253,926
5 Claims. (Cl. 260—666)

This invention relates to a process and apparatus for producing high purity cyclohexane from a mixed stream of $C_6$ hydrocarbons.

In the production of cyclohexane from a refinery stream of mixed $C_6$ hydrocarbons, one of the problems involved is the separation of 2,2- and 2,4-dimethylpentanes from the feed. These compounds are difficult to separate from cyclohexane and methylcyclopentane because of their close boiling points to those of cyclohexane and methylcyclopentane. This invention is concerned with a method for converting methylcyclopentane to cyclohexane which readily eliminates 2,2- and 2,4-dimethylpentanes from the $C_6$ hydrocarbons being treated.

Accordingly, it is an object of the invention to provide a process for the production of high purity cyclohexane utilizing a unique method of removing 2,2- and 2,4-dimethylpentanes from a common $C_6$ feed found in refinery operations. Another object is to provide a novel process for producing high purity cyclohexane from a common refinery stream containing n-hexane, cyclohexane, methylcyclopentane, benzene, and 2,2- and 2,4-dimethylpentanes, with unique removal of the dimethylpentanes. Other objects of the invention will become apparent to one skilled in the art upon consideration of the accompanying disclosure.

A broad aspect of the invention comprises contacting a mixed $C_6$ feed containing n-hexane, cyclohexane, methylcyclopentane, benzene, and 2,2- and 2,4-dimethylpentanes in a hydroisomerization reaction zone with a hydroisomerization catalyst and in admixture with hydrogen so as to convert cyclohexane to methylcyclopentane, n-hexane to isohexanes, and 2,2- and 2,4-dimethylpentanes to n-heptane and higher boiling isoheptanes; fractionating the effluent from the hydroisomerization step to recover an overhead fraction comprising principally methylcyclopentane, n-hexane, isohexanes, and benzene, and a bottoms fraction comprising principally cyclohexane, n-heptane, and isoheptanes; hydrogenating the overhead fraction in contact with a hydrogenation catalyst in admixture with hydrogen to convert benzene therein to cyclohexane; isomerizing the effluent from the hydrogenation step in contact with an isomerizing catalyst to convert n-hexane to isohexanes and to convert methylcyclopentane to cyclohexane; fractionating the effluent from the preceding isomerization step to recover an overhead fraction comprising principally isohexane, unconverted n-hexane, and methylcyclopentane, and a bottoms fraction comprising principally cyclohexane; and fractionating the bottoms fraction of the first fractionation step to recover an overhead fraction comprising principally cyclohexane and a bottoms fraction comprising principally heptanes. The overhead fraction from the last-mentioned fractionation step, comprising principally cyclohexane, also contains impurities in sufficient quantity that it is recycled along with the feed to the hydroisomerization step. In this way the cyclohexane is converted to methylcyclopentane which is again reconverted to cyclohexane and the impurities in the recycled stream are removed during the process.

The preferred hydroisomerization catalyst comprises platinum-halogen on active alumina. Other hydroisomerization catalyst may be utilized less advantageously, however. The preferred hydrogenation catalyst comprises nickel in metallic form supported on kieselguhr. Other hydrogenation catalysts supported on kieselguhr or other silica or silica-alumina supports may be utilized. Nickel may also be supported on other similar supports. The preferred iomerization catalyst for the isomerization step following the isomerization step comprises HCl-promoted $AlCl_3$-hydrocarbon complex. Other active isomerization catalysts may be utilized in lieu of the aforesaid catalyst.

By passing the feed through the hydroisomerization zone, the 2,2- and 2,4-dimethylpentanes are converted to isoheptanes and normal heptane which have higher boiling points than cyclohexane. By fractionating the effluent from the hydroisomerization zone, taking the MCP and lighter hydrocarbons overhead and the cyclohexane and heavier hydrocarbons as the bottoms fraction, the cyclohexane and $C_7$'s in the bottoms fraction may be readily fractionated to separate the cyclohexane from the $C_7$'s, thereby eliminating the 2,2- and 2,4-dimethylpentanes from the system.

A more complete understanding of the invention may be had by reference to the flow sheet shown in the schematic drawing illustrating the process.

In the drawing, a mixed $C_6$ feed containing n-hexane, cyclohexane, methylcyclopentane, benzene, and 2,2- and 2,4-dimethylpentanes, after removal of isohexanes therefrom, is passed through line 10 along with hydrogen from line 12 into hydroisomerization reactor 14 which contains a platinum-halogen-alumina catalyst and is maintained preferably in the temperature range of 500 to 800° F., more desirably in the temperature range of 600 to 750° F. and under other reaction conditions which convert cyclohexane to methylcyclopentane, n-hexane to isohexanes, and 2,2- and 2,4-dimethylpentanes to n-heptane and isoheptanes. The reaction effluent is passed through line 16 into fractionator 18 which is maintained under conditions which pass the methylcyclopentane and lighter products overhead through line 20 to hydrogenation reactor 22, and a bottoms fraction comprising cyclohexane and heptanes through line 24 to fractionator 26.

The dimethylpentanes have been converted to n-heptane and isoheptanes in reactor 14 and these conversion products are separated in fractionator 26 as a bottoms fraction which is recovered through line 28. The overhead fraction comprising cyclohexane and other $C_6$ and lighter hydrocarbons is passed through line 30 to line 10 as recycle to the hydroisomerization step.

Hydrogenation is effected in reactor 22 under conventional hydrogenation conditions over a nickel-kieselguhr catalyst principally to convert benzene to cyclohexane, the benzene being detrimental to the catalyst in the downstream isomerization zone. The effluent from the hydrogenation reactor 22 is passed through line 32 into isomerization reactor 34 which is maintained preferably in the temperature range of 80 to 160° F., more desirably in a temperature range of 120 to 140° F. and is provided with an HCl-promoted aluminum chloride-hydrocarbon complex catalyst so as to convert n-hexane to isohexanes and methylcyclopentane to cyclohexane. The reaction effluent is passed through line 36 to fractionator 38 which is operated under conditions which take the isohexanes and lighter overhead and cyclohexane and heavier hydrocarbons as a bottoms fraction. The overhead is recovered through a line 40 and may be combined with isohexanes separated from the feed, initially; and the bottoms fraction is passed through line 42 into fractionator 44 for separation of the cyclohexane overhead which is recovered through line 46 and heavier hydrocarbons recovered through line 48.

The invention is devised to maximize production of high purity cyclohexane and conversion of n-hexane to isohexanes. The hydroisomerization step converts cyclohexane to methylcyclopentane, achieving an equilibrium ratio of about 3:1 of MCP to cyclohexane and converts n-hexane to isohexanes, and stabilizes the resulting effluent to remove C₅ and lighter components. An important feature of this hydroisomerization step is the conversion of 2,2- and 2,4-dimethylpentanes to higher boiling isoheptanes and normal heptane which can be separated readily from cyclohexane by conventional fractionation.

The following example illustrates operation in accordance with the invention utilizing the flow of the drawing to produce a product stream of cyclohexane of more than 98 percent purity and isohexanes as a separate product stream.

Example

TOWER CONDITIONS

|  | Tower 18 | Tower 26 | Tower 38 | Tower 44 |
|---|---|---|---|---|
| Top Temp., °F | 249 | 250 | 245 | 250 |
| Top Pressure, p.s.i.g | 40 | 35 | 40 | 35 |
| Bottom Temp., °F | 289 | 300 | 289 | 300 |
| Bottom Pressure, p.s.i.g | 49 | 40 | 49 | 40 |

REACTION CONDITIONS

|  | No. 14 Reactor | No. 22 Reactor | No. 34 Reactor |
|---|---|---|---|
| Pressure, p.s.i.g | 500 | 450 | 170 |
| Temp., °F | 750 | 485 | 120 |
| Space Velocity, v./v./hr | 2 | 2 |  |
| Type Catalyst | "Platinum" | "Nickel" | AlCl₃ Complex |
| H₂/Oil Mol Ratio | 2.5 | 0.4 | None |

| | Stream Number (Volumes,[1] Mols/Day) | | | | | |
|---|---|---|---|---|---|---|
| | Feed (10) | Recycle (30) | Combined Feed To Reactor (14) (10+30) | Reactor (14) Effluent (16) | Bottoms of DMCP (18)(24) | Bottoms of DCyC₆ (26)(28) |
| Component: | | | | | | |
| Isohexanes | 1,600 | -------- | 1,600 | 7,500 | -------- | -------- |
| Normal Hexane | 8,044 | 2 | 8,046 | 2,146 | 2 | -------- |
| Methylcyclopentane | 3,637 | 110 | 3,747 | 5,497 | 110 | -------- |
| 2,2-dimethylpentane | 107 | 23 | 130 | 27 | 23 | -------- |
| Benzene | 500 | 499 | 999 | 999 | 502 | 3 |
| 2,4-dimethylpentane | 215 | 20 | 235 | 23 | 21 | 1 |
| Cyclohexane | 1,822 | 539 | 2,361 | 611 | 550 | 11 |
| 2,2,3-trimethylbutane | -------- | 16 | 16 | 18 | 16 | -------- |
| 3,3-dimethylpentane | -------- | 6 | 6 | 32 | 32 | 26 |
| 2,3-dimethylpentane | -------- | -------- | -------- | 113 | 113 | 113 |
| 2-methylhexane | -------- | 2 | 2 | 77 | 77 | 75 |
| 3-methylhexane | -------- | 1 | 1 | 109 | 109 | 108 |
| 3-ethylpentane | -------- | -------- | -------- | 9 | 9 | 9 |
| Normal Heptane | 63 | -------- | 63 | 45 | 45 | 45 |
| Total | 15,988 | 1,218 | 17,206 | 17,206 | 1,609 | 391 |

| | Stream Number (Volumes,[1] Mols/Day)—Continued | | | | | | |
|---|---|---|---|---|---|---|---|
| | Overhead of DMCP (18)(20) | Hydrogenation Effluent (32) | Isomerization Effluent (36) | Tower (38) Overhead (40) | Tower (38) Bottoms (42) | Tower (44) Overhead (46) | Tower (44) Bottoms (48) |
| Component: | | | | | | | |
| Isohexanes | 7,500 | 7,500 | 9,000 | 9,000 | -------- | -------- | -------- |
| Normal Hexane | 2,144 | 2,144 | 644 | 644 | -------- | -------- | -------- |
| Methylcyclopentane | 5,387 | 5,387 | 1,338 | 1,325 | 13 | 13 | -------- |
| 2,2-dimethylpentane | 4 | 4 | 2 | -------- | 2 | 2 | -------- |
| Benzene | 497 | -------- | -------- | -------- | -------- | -------- | -------- |
| 2,4-dimethylpentane | 2 | 2 | 1 | -------- | 1 | 1 | -------- |
| Cyclohexane | 61 | 558 | 4,594 | 184 | 4,410 | 4,400 | 10 |
| 2,2,3-trimethylbutane | 2 | 2 | 1 | -------- | 1 | 1 | -------- |
| 3,3-dimethylpentane | -------- | -------- | 1 | -------- | 1 | 1 | -------- |
| 2,3-dimethylpentane | -------- | -------- | 2 | -------- | 2 | 2 | -------- |
| 2-methylhexane | -------- | -------- | 1 | -------- | 1 | 1 | -------- |
| 3-methylhexane | -------- | -------- | -------- | -------- | -------- | -------- | -------- |
| 3-ethylpentane | -------- | -------- | -------- | -------- | -------- | -------- | -------- |
| Normal Heptane | -------- | -------- | [2] (10) | -------- | [2] (10) | -------- | [2] (10) |
| Total | 15,957 | 15,597 | 15,594 | 11,153 | 4,441 | 4,421 | 20 |

[1] Hydrogen flow not shown.
[2] Heavy reaction products.

The foregoing example is illustrative of the invention and is not to be interpreted as unnecessarily limiting the invention.

Certain modifications of the invention will become apparent to those skilled in the art and the illustrative details disclosed are not to be construed as imposing unnecessary limitations on the invention.

We claim:
1. A process for producing cyclohexane from a C₆ hydrocarbon feed mixture containing n-hexane, cyclohexane, methylcyclopentane, benzene, and 2,2- and 2,4-dimethylpentanes and treated to remove a substantial proportion of isohexanes, which comprises the steps
   (1) contacting said feed without fractionation thereof in a hydroisomerization zone with a hydroisomerization catalyst consisting essentially of Pt-halogen distended on active alumina and in admixture with hydrogen at a temperature in the range of 500–800° F. so as to convert
      (a) cyclohexane to methylcyclopentane,
      (b) n-hexane to isohexanes, and
      (c) 2,2- and 2,4-dimethylpentanes to n-heptane and higher boiling isoheptanes;
   (2) fractionating the effluent from step (1) to recover
      (a) an overhead fraction comprising principally methylcyclopentane, n-hexane, isohexanes, benzene, and
      (b) a bottoms fraction comprising principally cyclohexane, n-heptane, and isoheptanes and a minor amount of benzene;
   (3) hydrogenating overhead fraction (a) of step (2) in contact with a hydrogenation catalyst and in admixture with hydrogen to convert benzene therein to cyclohexane;
   (4) isomerizing the effluent from step (3) in contact with an isomerizing catalyst to convert
      (a) n-hexane to isohexanes, and

(b) methylcyclopentane to cyclohexane;
(5) fractionating the effluent from step (4) to recover
   (a) an overhead fraction comprising principally isohexanes, unconverted n-hexane, and methylcyclopentane, and
   (b) a bottoms fraction comprising principally cyclohexane; and
(6) fractionating bottoms fraction (b) of step (2) to recover
   (a) an overhead fraction comprising principally cyclohexane and a substantial proportion of benzene, and
   (b) a bottoms fraction comprising principally heptanes.

2. The process of claim 1 including the step of recycling overhead fraction (a) of step (6) to step (1) to form additional methylcyclopentane from cyclohexane, the benzene in the recycled overhead fraction being passed to step (3).

3. The process of claim 1 wherein said hydrogenation catalyst of step (3) comprises nickel, and the isomerization catalyst of step (4) consists essentially of an HCl promoted $AlCl_3$-hydrocarbon complex.

4. The process of claim 3 wherein the temperature in the hydroisomerization zone of step (1) is in the range of 600 to 750° F., and the temperature in isomerization step (4) is in the range of 120 to 140° F.

5. The process of claim 1 including the step of fractionating bottoms fraction (b) of step (5) to recover
   (a) an overhead fraction consisting of at least 98 percent cyclohexane, and
   (b) a bottoms fraction of heavier hydrocarbons than cyclohexane.

References Cited by the Examiner
UNITED STATES PATENTS

| | | | |
|---|---|---|---|
| 2,382,446 | 8/1945 | Ross et al. | 260—666 |
| 2,821,561 | 1/1958 | Pevere et al. | 260—666 |
| 2,952,715 | 9/1960 | Donaldson et al. | 260—683.68 |
| 2,953,606 | 9/1960 | Dean et al. | 260—666 |
| 2,999,890 | 9/1961 | Davison | 260—666 |

DELBERT E. GANTZ, *Primary Examiner.*

DANIEL E. WYMAN, *Examiner.*